Patented June 29, 1943

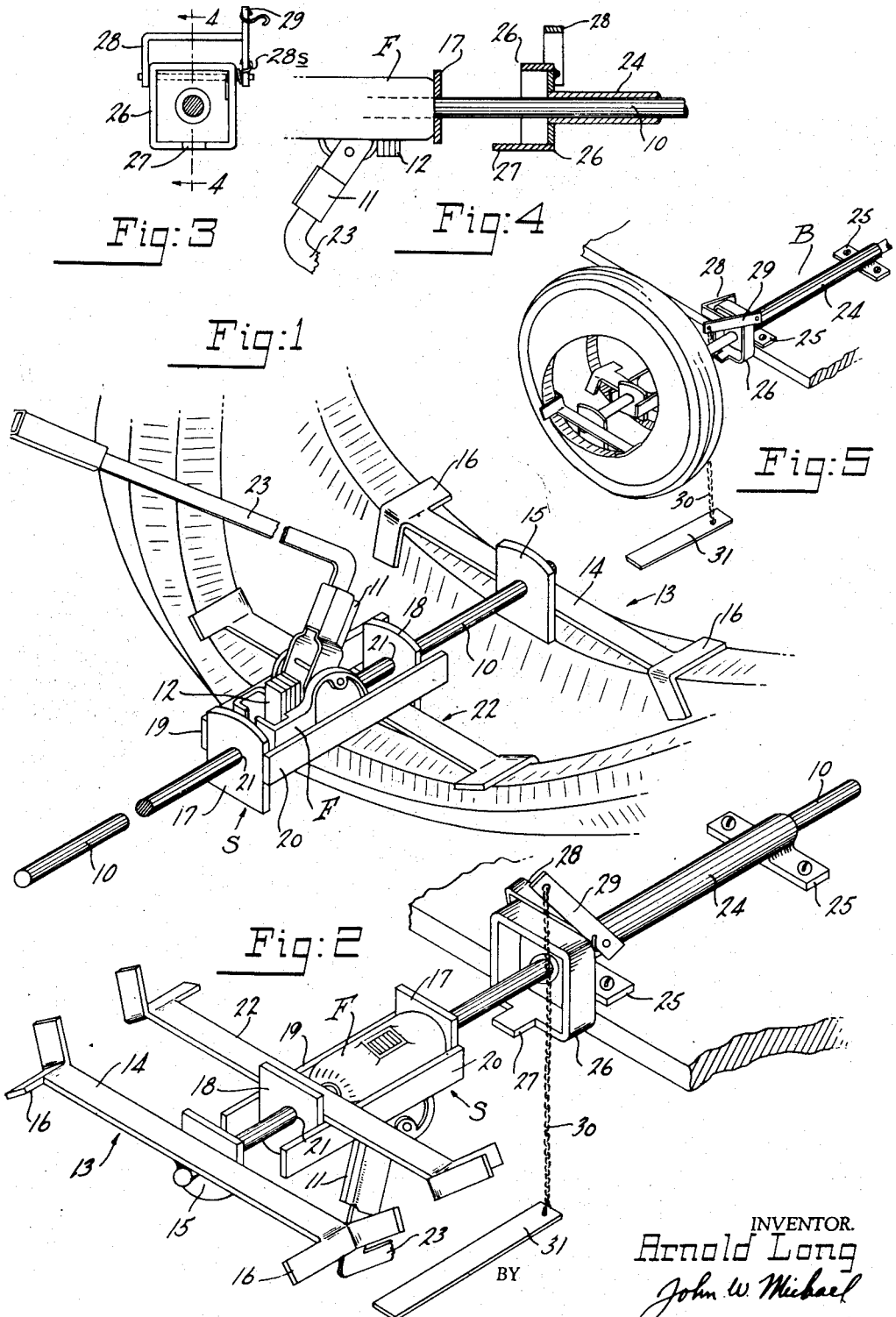

2,323,144

UNITED STATES PATENT OFFICE 2,323,144

TIRE SPREADER

Arnold Long, Menominee, Mich.

Application August 8, 1940, Serial No. 351,856

10 Claims. (Cl. 154—9)

This invention relates to improvements in tire spreaders.

One of the objects is to provide an improved manually operable tire spreader which is light enough to be portable and strong enough to spread the beads of heavy duty tires for trucks, tractors, and the like.

Another object is to provide a tire spreader which will be rapid but smooth and sure in its releasing movement.

Another object is to provide an improved tire spreader and bench attachment which permits the tire spreader to be used without employing the force multiplying means incorporated therein.

Another object is to provide an improved manually operable tire spreader which utilizes a friction type jack as its source of power.

The foregoing objects are accomplished by utilizing a friction type of jack as the motivating force of the tire spreader. The friction type of jack most adaptable is that which has a friction rod and two groups of leaf wedge elements engageable with the rod and held in associated position by the body of the jack. In this type of jack one group of wedges is used with a force-multiplying lever to forcibly move the jack in one direction relative to the rod. Movement in the reverse direction is opposed by the other group of wedges. The holding effect of this latter group may be diminished in degree by tilting them until normal to the friction rod. The utilization of this type of jack is obtained by securing to one end of the friction rod a bead-engaging member and by providing a saddle having an oppositely related bead-engaging member, which saddle is slidable along the friction rod and interconnected with the jack to be motivated thereby. To enlarge the uses of the spreader it may be associated with a tubular bench fixture which has a cage-like member adapted to receive and hold the saddle against rotation. Whenever it is desired to operate the spreader without the use of the force-multiplying means, the jack is held in the bench attachment against longitudinal movement, and the bead-engaging member on the rod is pulled outwardly, the tendency of the tire to compress the spreader being resisted by the lockable leaf wedges of the jack.

The novel features, which are considered characteristic of the invention, are set forth with particularity in the appended claims. The invention itself, however, both as to its organization and its method of operation, together with additional objects and advantages thereof, will best be understood from the following description of a specific embodiment when read in connection with the accompanying drawing, in which:

Figure 1 is a perspective view of the tire spreader in opened position, the beads of a tire being separated thereby;

Figure 2 is a perspective view of the tire spreader turned longitudinally through 180° from the view of Figure 1 and including the bench attachment and latching mechanism;

Figure 3 is an end view of the bench attachment showing the latching bar;

Figure 4 is a sectional view taken on the line 4—4 of Figure 3;

Figure 5 is a perspective view similar to the view of Figure 2 showing the spreader holding a tire in a position rotated 180° from the position shown in Figure 2.

Referring in greater detail to the drawing, the tire spreader utilizes a friction jack F. In the exemplification shown, the friction jack is a standard type of leaf wedge friction jack. Further description of the friction jack will be made only for the purpose of defining its organizational relationship with other parts comprising the tire spreader. The friction jack F is movable along the friction rod 10 in either direction. In one direction its movement is controlled by the application of force either directly to the jack F or through the force-multiplying lever 11 and one of two sets of leaf wedges (not shown). Movement of the jack F in the other direction is resisted by the other set of leaf wedges indicated at 12, the holding action of which wedges may be modified in degree by tilting them from an angled relationship to the rod until normal thereto.

At one end of the rod 10 is provided a bead-engaging member 13. The bead-engaging member 13 comprises an elongated arm 14 provided with a socket-like member 15 centrally located thereon. The socket-like member 15 engages with the end of the rod 10 and may be either welded or otherwise secured thereto. Each end of the arm 14 is provided with jaws 16. The jaws 16 are sloped so that one leg thereof is substantially tangent to a circle, the diameter of which is approximately the average diameter of the average type of tire in commercial use. The other leg of the jaws 16 projects radially from the arm 14. The jaws 16 are thus readily engageable with the bead of a tire to be spread.

A saddle S comprises two end members 17 and 18 which are joined and rigidly held by oppositely positioned side members 19 and 20 welded or otherwise secured to the side edges of the end members 17 and 18. The side members 19 and 20 project slightly beyond the outer confines of the end member 18 to provide guides for the bead-engaging member 13 when it is in its fully closed position. The end members 17 and 18 are provided with alined apertures 21 to slidably receive the rod 10. The bead-engaging member 22, constructed identically with the bead-engaging member 13 heretofore described, is secured to the rear of the end member 18 and to the respective edges of side members 19 and 20. By reversing the bead-engaging member 22 its jaw members are symmetrically but oppositely related to the jaw members of the bead-engaging member 13. The relative positioning of the side members 19 and 20 with respect to the end members 17 and 18 and their respective apertures 21 is such that the arm of the bead-engaging member 22 lies adjacent the rod 10 when the saddle S is positioned thereon. The longitudinal spacing between the end member 17 and the edge of the bead-engaging member 22 is such as to easily but snugly receive the body of the jack F therebetween. To assemble the jack F and saddle S on the rod 10 the jack F is first placed within the confines of the saddle S, as illustrated in Figure 2, and then both are slid on to the rod 10. It will be seen that with this construction the saddle S and jack F are constrained to move together.

There is provided for the operation of the force-multiplying lever 11 an operating arm 23. The arm 23 is bent at right angles so that its handle portion extends generally in the same direction as the projecting end of the rod 10. To conveniently operate the force-multiplying lever 11, the rod 10 is grasped by the operator in one hand and the handle 23 in the other and the two reciprocated. The jack F is moved outwardly along the rod 10 in small increments as the result of this action of the handle 23.

To start the operation of the jack, the bead-engaging members 13 and 22 are drawn together so that the radially extending legs of the jaw members are substantially together. The tire spreader may then be placed in a tire so that the beads of the tire are engaged by the bead-engaging members as is illustrated in Figure 1. Operation of the lever 23 in the manner heretofore described causes the jack F to move outwardly along the rod 10, thus causing separation between the bead-engaging members 13 and 22, thereby spreading the tire against its inherent resilience. In order to permit the beads of the tire to again come together and carry with them the bead-engaging members 13 and 22, it is only necessary that the operator insert the handle 23 in the jack F just forward (as viewed in Figure 1) of the leaf wedges 12. Movement of the handle 23 away from the rod 10 will then cause the leaf wedges 12 to move from their angular relationship to the rod 10 to position normal thereto. As this movement occurs the gripping action between the wedges 12 and the rod 10 is released and the saddle S and jacket F are permitted to be moved inwardly along the rod 10 under the resilient inherent force of the tire.

The tire spreader as heretofore described is particularly adapted for use with heavy tires. When so used, the tire remains on the floor of the garage or the like, and is merely placed in a leaning position against any available object. By grasping the rod 10 and the handle 23, the tire may be conveniently and readily wheeled about on the floor for the purpose of inspection and the like. The same device may also be utilized as a bench device by using it in conjunction with a bench attachment B.

The bench attachment B comprises generally an elongated tubular member 24 to which is welded or otherwise secured bench-attaching flanges 25. At one end of the tube 24 is positioned a cage member 26 which is square in outline and has extending side members adapted to receive the end of the saddle S within their confines in any of four ninety degree spaced positions. The lower side of the cage 26 is provided with a projection 27 which is adapted to engage with the group of leaf wedges 12 when the saddle S and jack F are moved into the cage 26 the full extent of the longitudinal movement permitted. This releases the gripping effect of the wedges 12 as pressure is exerted inwardly on the bead-engaging member 13 and rod 10.

Pivoted to the rear of the cage member 26, as viewed in Figure 2, is a spring-biased latch 28. The latch 28 is biased to the upward position shown in Figures 2 and 4 by spring 28s. When the saddle S is positioned within the confines of the cage 26, the latch 28 may be moved counter-clockwise, as viewed in Figure 4, to the position shown in Figure 5. In this position the latch engages end member 17, preventing the withdrawal of that member and consequently the saddle S. When so held the operator may grasp the bead-engaging member 13 and forcibly draw it and the rod 10 outwardly from the jack F and away from bead-engaging member 22. In order to facilitate the operation of the latch 28 and hold the same in the saddle-engaging position, there is provided a lever 29 to which is attached a chain 30 leading downwardly to a treadle 31. The operator by stepping on the treadle 31 causes the latch to be moved counter-clockwise against the tensioning in its biasing spring to the saddle-engaging position.

The bench attachment B is used in most instances in connection with the lighter or pleasure car type of tire. With such tire it is not necessary to use the force-multiplying mechanism provided in the jack. The operator can, if one side of the spreader is held, easily force the tire to open position by direct pull. This momentary holding action is accomplished by using the latch 28, as heretofore described. Upon release of the treadle 31 the latch 28 is released. The spreader and tire may then be changed to any of four positions. To change the position it is merely necessary to withdraw the saddle S longitudinally from the tube 24 an amount sufficient to permit the end 17 to clear the sides of the cage, whereupon the entire unit may be rotated ninety degrees to the next position and be moved longitudinally back within the cage to be held in such position. In order to facilitate the rotating of the saddle S without removing the same too far from the cage 26, the edges of the end member 17 may be cut in the arc of a curve, permitting clearance with respect to the projection 27.

Although there is shown and described certain specific embodiments of the invention, many modifications thereof are possible. The invention is not to be restricted except in so far as is necessitated by the prior art and by the spirit of the appended claims.

I claim:

1. A tire spreader comprising a friction rod, a bead-engaging member secured to one end of said rod, a friction jack movable along said rod intermediate its ends under the control of the operator, a saddle slidably supported on said rod and associated with said jack so as to be moved thereby, and a bead-engaging member secured to said saddle, said rod having its other end projecting beyond said saddle to provide an operating handle for said spreader.

2. A tire spreader comprising a friction rod, a spreader arm secured to one end of said rod, bead-engaging jaws positioned at the ends of said arms, a friction jack movable along said rod intermediate its ends, a saddle having spaced end bearings slidably mounted on said rod, a spreader arm secured to said saddle at the end thereof adjacent said first mentioned spreader arm, bead-engaging jaws positioned at the ends of said last mentioned spreader arm, said jack being positioned between said bearings whereby its movement along said rod causes the positioning of one spreader arm relative to the other, and an operating lever for said jack, said rod having its other end projecting sufficiently far beyond said saddle to provide an operating handle which may be grasped by the operator and used in conjunction with said lever to operate said jack.

3. A tire spreader comprising a friction rod, a bead-engaging member secured to one end of said rod, a friction jack movable along said rod intermediate its ends, a bead-engaging member associated with said friction jack, a tubular member adapted to slidably receive the other end of said friction rod, means for securing said tubular member to a fixed support, a lever on said tubular member adapted to releasably hold said friction jack from movement longitudinally of said tube whereby said rod may be moved relative to said jack.

4. A tire spreader comprising a friction rod, a bead-engaging member secured to said rod, a friction jack movable along said rod in one direction under force applied by the operator, releasable locking means on said jack preventing movement in the other direction, a bead-engaging member secured to said jack, a tubular member adapted to slidably receive said friction rod, means for securing said tubular member to a fixed support, and finger means on said tubular member adapted to co-act with said locking means to release the same.

5. A tire spreader comprising a friction rod, a bead-engaging member secured to said rod, a friction jack movable along said rod, a saddle slidably supported on said rod and associated with said jack so as to be moved thereby, a bead-engaging member secured to said saddle, holding means adapted to rotatably and slidably receive said rod, said holding means being adapted to be secured to a fixed support, and a cage-like member secured to said means and adapted to receive said saddle in a plurality of selectable positions and hold the same against rotation.

6. A tire spreader comprising a friction rod, a bead-engaging member secured to said rod, a friction jack movable along said rod, a saddle slidably supported on said rod and associated with said jack so as to be moved thereby, a bead-engaging member secured to said saddle, holding means adapted to rotatably and slidably receive said rod, said holding means being adapted to be secured to a fixed support, a cage-like member secured to said means and adapted to receive said saddle in a plurality of selectable positions and hold the same against rotation, and a latch associated with said cage-like member and adapted to releasably engage said saddle to withstrain the same against longitudinal movement relative to said cage-like member.

7. A tire spreader comprising a friction rod, a bead-engaging member secured to said rod, a friction jack movable along said rod, a saddle slidably supported on said rod and associated with said jack so as to be moved thereby, a bead-engaging member secured to said saddle, holding means adapted to rotatably and slidably receive said rod, said holding means being adapted to be secured to a fixed support, a cage-like member secured to said means and adapted to receive said saddle in a plurality of selectable positions and hold the same against rotation, a latch associated with said cage-like member and adapted to releasably engage said saddle to withstrain the same against longitudinal movement relative to said cage-like member, said latch being biased to unlatched position, and treadle means associated therewith whereby said latch may be moved to latching position by the foot of the operator.

8. A tire spreader comprising a friction rod, a bead-engaging member secured to said rod, a friction jack movable along said rod in one direction, releasable locking means on said jack preventing movement in the other direction, a saddle slidably supported on said rod and associated with said jack so as to be moved thereby, a bead-engaging member secured to said saddle, holding means adapted to rotatably and slidably receive said rod, said holding means being adapted to be secured to a fixed support, a cage-like member secured to said holding means and adapted to receive said saddle in a plurality of selectable positions and hold the same against rotation, and a finger member on said cage adapted to engage with said lock to release the same when said saddle is moved to its full extent within said cage.

9. A tire spreader comprising a friction rod, a bead-engaging member secured to said rod, a friction jack movable along said rod in one direction, releasable locking means on said jack preventing movement in the other direction, a saddle slidably supported on said rod and associated with said jack so as to be moved thereby, a bead-engaging member secured to said saddle, holding means adapted to rotatably and slidably receive said rod, said holding means being adapted to be secured to a fixed support, a cage-like member secured to said holding means and adapted to receive said saddle in a plurality of selectable positions and hold the same against rotation, a finger member on said cage adapted to engage with said lock to release the same when said saddle is moved to its full extent within said cage, and a latch associated with said cage-like member and adapted to releasably engage said saddle to withstrain the same against longitudinal movement relative to said member.

10. A tire spreader comprising a friction rod, a bead-engaging member secured to said rod, a friction jack movable along said rod in one direction, releasable locking means on said jack preventing movement in the other direction, a saddle slidably supported on said rod and associated with said jack so as to be moved thereby, a bead-engaging member secured to said saddle, holding means adapted to rotatably and slidably receive said rod, said holding means being adapted to be secured to a fixed support, a cage-like member secured to said holding means and adapted to receive said saddle in a plurality of selectable positions and hold the same against rotation, a finger member on said cage adapted to engage with said lock to release the same when said saddle is moved to its full extent within said cage, a latch associated with said cage-like member and adapted to releasably engage said saddle to withstrain the same against longitudinal movement relative to said cage-like member, and treadle means associated therewith whereby said latch may be moved to latching position by the foot of the operator.

ARNOLD LONG.